(12) United States Patent
Johlic et al.

(10) Patent No.: US 8,584,001 B2
(45) Date of Patent: Nov. 12, 2013

(54) MANAGING BOOKMARKS IN APPLICATIONS

(75) Inventors: Marc Kevin Johlic, Seminole, FL (US); Emi Kondo Olsson, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 12/758,472

(22) Filed: Apr. 12, 2010

(65) Prior Publication Data

US 2011/0252298 A1    Oct. 13, 2011

(51) Int. Cl.
*G06F 17/00* (2006.01)
*G06F 3/00* (2006.01)
*G06F 3/048* (2013.01)

(52) U.S. Cl.
USPC ............ 715/206; 715/208; 715/705; 715/810

(58) Field of Classification Search
USPC .................................. 715/705, 810, 206, 208
See application file for complete search history.

(56) References Cited

U.S. PATENT DOCUMENTS

| | | | |
|---|---|---|---|
| 5,961,602 A | | 10/1999 | Thompson et al. |
| 6,208,338 B1 * | | 3/2001 | Fischer et al. ............... 715/705 |
| 6,456,303 B1 | | 9/2002 | Walden et al. |
| 6,460,038 B1 | | 10/2002 | Khan et al. |
| 6,667,747 B1 * | | 12/2003 | Spellman et al. ............. 715/714 |
| 7,636,887 B1 * | | 12/2009 | Kinnucan, Jr. ................ 715/705 |
| 2004/0073696 A1 * | | 4/2004 | Kim ............................... 709/232 |
| 2004/0255234 A1 * | | 12/2004 | Methot .......................... 715/500 |
| 2006/0085750 A1 * | | 4/2006 | Easton, et al. ................ 715/708 |
| 2006/0117315 A1 * | | 6/2006 | Bussert et al. ................ 717/174 |
| 2006/0129931 A1 * | | 6/2006 | Simons et al. ................ 715/705 |
| 2006/0277468 A1 * | | 12/2006 | Sapir ............................. 715/708 |
| 2010/0049800 A1 * | | 2/2010 | Hatfield et al. ............... 709/204 |

FOREIGN PATENT DOCUMENTS

DE    10051019 A1    8/2001
JP    2009199399 A    9/2009

OTHER PUBLICATIONS

Quan et al., "How to Make a Semantic Web Browser", Proceedings of the 13th international conference on World Wide Web 2004, May 2004 New York NY, pp. 255-265.
Zuccala et al., Web Intelligence Analyses of Digital Libraries: A Case Study of the National electronic Library for Health (NeLH), pp. 1-32, retrieved Feb. 17, 2010 http://individual.utoronto.ca/azuccala_web/AZuccala-et-al.pdf.
"Favorites Menu for Visual Studio", pp. 1-3, retrieved Feb. 15, 2010 http://visualstudiogallery.msdn.microsoft.com/en-us/00F3B972-CB54-47F2-AC56-B2F48C77A74D.
"Microsoft Visual Studio 2008 Unleashed—Chapter 7, The .NET Community: Consuming and Creating Shared Code", pp. 1-14, Safari Books Online.

\* cited by examiner

*Primary Examiner* — Adam M Queler
(74) *Attorney, Agent, or Firm* — Yee & Associates, P.C.; Arthur J. Samodovitz

(57) ABSTRACT

A method, data processing system, and computer program product for managing bookmarks. An application program, executed by a processor unit, identifies an external bookmark associated with a function in response to receiving a user input requesting information about the function in an application program executed by a processor unit in a computer, wherein the external bookmark points to a webpage available from another computer. The application program displays the identified bookmark.

23 Claims, 8 Drawing Sheets

MANAGING BOOKMARKS IN APPLICATIONS

BACKGROUND

1. Field

The disclosure relates generally to data processing systems and, more specifically, to a method and apparatus for processing data. Still more particularly, the present disclosure relates to a method and apparatus for managing bookmarks in an application.

2. Description of the Related Art

Applications have become more sophisticated and complex over time. For example, more and more functions have been added to applications to allow users to form new and distinct tasks. For example, a word processing program includes many functions in addition to the entry and editing of text. A word processing program may include functions for macros, importing tables, creating graphs, inserting links for universal resource locators, tracking changes, security, and other suitable functions.

With the increasing number of functions in applications, users may be unable to use all the functions in performing tasks. This inability comes from a lack of knowledge of how a function works or how to obtain the desired results. For example, oftentimes, various functions may require numerous steps to perform a particular task. The task may be, for example, changing security options in a document. The steps needed to perform this task may not be intuitive to a user from the menu system or the naming of functions.

Although applications become more complex in the number and types of functions, the usability of applications is increased through the use of help functions. For example, most applications have a help option in a menu. By selecting the help option, a user can look at topics for functions about which they would like to have more information. The information for these help functions is typically stored in a file and installed with the application.

For example, when a user wants to know how to change security options in a document generated by an application, the help function in the application may be used to identify a topic about security options. The user may then read the information in the topic identified to obtain the desired information about the security options. Additionally, many applications also provide a search feature to search for keywords within the different topics for which help is provided by the application.

However, the information provided by an application in the help topics may not be sufficient to answer questions that a user may have. Additionally, the information provided, in some cases, may answer the question, but not in a manner that is easily understood by the user.

As a result, users oftentimes search for help on the Internet. Users may find websites that provide additional information about different functions in an application. The user may then save that webpage as a bookmark in the browser application. For example, the user may find a webpage that provides step-by-step instructions to change security options in a document. These step-by-step instructions on the webpage may be easier to follow than the information provided through the help function in the application.

SUMMARY

In the illustrative embodiments, a method, data processing system, and computer program product for managing bookmarks are present. An application program, executed by a processor unit, identifies an external bookmark associated with a function in response to receiving a user input requesting information about the function in an application program executed by a processor unit in a computer, wherein the external bookmark points to a webpage available from another computer. The application program displays the identified bookmark.

DETAILED DESCRIPTION

Figure 1:
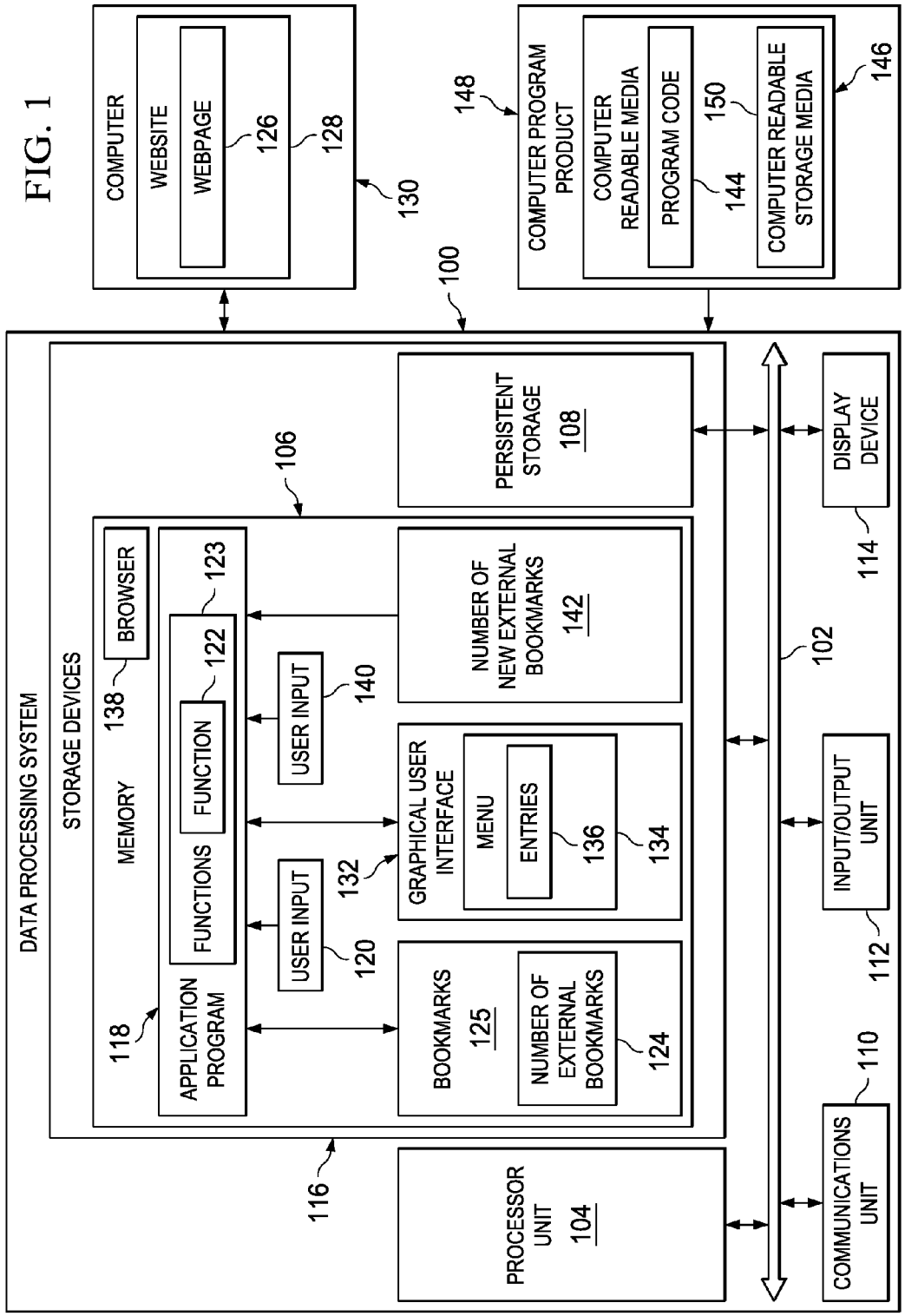
FIG. 1 is an illustration of a data processing system in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable device(s) may be utilized. The computer usable or computer readable storage device may be, for example, but not limited to, an electronic, magnetic, optical, electromagnetic, infrared, or semiconductor system, apparatus, or device. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

In the context of this document, a computer usable or computer readable medium may be any medium that can contain or store the program for use by or in connection with the instruction system, apparatus, or device.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide processes for implementing the functions/acts specified in the flowchart and/or block diagram block or blocks.

The different illustrative embodiments recognize and take into account a number of different considerations. For example, the different illustrative embodiments recognize and take into account that a user may find resources on the Internet that provide information on how to use functions in an application. These resources may be, for example, a webpage. The webpage may provide a video, text, graphics, screenshots, animations, and/or other information useful for providing information about a function in an application. These webpages may be easier to follow and/or more straightforward than the information provided through the help function in an application. Users may save the universal resource locaters to these webpages as bookmarks. These bookmarks and other bookmarks for other pages are saved in the browser used to view the webpages.

Although finding information on the internet and saving resources as bookmarks may be helpful, the later use of these bookmarks may be cumbersome. For example, a user may save bookmarks to favorite websites for tips and help on an application used by the user. At a later point in time, if the user desires to go back to one or more of those websites, the user must go back to the browser to find the bookmark. When the webpage at the website is located for a particular function with which the user needs help, the user has to move back and forth between the browser and the application to access the information.

The illustrative embodiments recognize and take into account that a user may have to resize the window for the application and a window for the browser to see both windows at the same time. When resizing windows, the user may be unable to see as much information as desired in the browser. In some cases, resizing the window for the application does not allow the user to easily perform the steps needed for the function when the window for the browser is also visible on the screen.

Thus, the illustrative embodiments provide a method and apparatus for managing bookmarks. In response to receiving user input requesting information about a function in an application on the processor unit, the application running on the processor unit identifies a number of external bookmarks associated with the function. Each of the external bookmarks points to a webpage at a website outside of the application. The application running on the processor unit displays the bookmarks in the application.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display device 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

Communications unit 110, in these examples, provides for communication with other data processing systems or devices. In these examples, communications unit 110 is a network interface card. Communications unit 110 may provide communications through the use of either or both physical and wireless communications links.

Input/output unit 112 allows for the input and output of data with other devices that may be connected to data processing system 100. For example, input/output unit 112 may provide a connection for user input through a keyboard, a mouse, and/or some other suitable input device. Further, input/output unit 112 may send output to a printer. Display device 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 or run by processor unit 104. The processes of the different embodiments may be performed by processor unit 104 using computer implemented instructions, which may be located in a memory, such as memory 106.

These instructions are referred to as program code, computer usable program code, or computer readable program code that may be read and run by a processor in processor unit 104. The program code, in the different embodiments, may be embodied on different physical or computer readable storage media, such as memory 106 or persistent storage 108.

In these illustrative examples, application program 118 is located in memory 106. Application program 118 may take various forms. For example, without limitation, application program 118 may be a word processing program, a spreadsheet application, an email program, an accounting application, a time-keeping application, and/or some other suitable type of application. In these illustrative examples, application program 118 provides a user easier access to bookmarks, as compared to currently available systems. In this depicted example, application program 118 receives user input 120 through input/output unit 112 in these examples. User input 120, in these illustrative examples, requests information about function 122 in functions 123 in application program 118. In these examples, function 122 may be, for example, a security function for macros.

In response to receiving user input 120, application program 118 identifies number of external bookmarks 124 in bookmarks 125. Number of external bookmarks 124 is one or more bookmarks associated with function 122. An external bookmark in number of external bookmarks 124 is a universal resource identifier that points to a resource outside of data processing system 100. In these depicted examples, the universal resource identifier may take the form of a universal resource locator.

Each of number of external bookmarks 124 points to a webpage, such as webpage 126 at website 128. In this depicted example, website 128 runs on computer 130. Webpage 126 is a resource that may be used to provide information to the user. For example, webpage 126 may include at least one of text, a graphic, an animation, a chart, a screenshot, a video, and other suitable information about function 122.

In the illustrative example, number of external bookmarks 124 may exclude the bookmarks supplied by the software company that made application program 118. In other words, number of external bookmarks 124 may be bookmarks selected by users. These users may be different users of application program 118. The users may be those who use functions 123 in application program 118 to perform tasks or users who search for information, such as web pages, that provide information about functions 123 used to perform tasks.

In these examples, application program 118 displays number of external bookmarks 124 identified for function 122 in functions 123. Number of external bookmarks 124 is displayed in graphical user interface 132. Graphical user interface 132 may be presented on display device 114.

In this illustrative example, graphical user interface 132 includes menu 134. Entries 136 are present in menu 134. An entry in entries 136 is an item that may be selected by user input in menu 134. An entry may be, for example, a function, a bookmark, a field for entering input, a check box, and/or some other suitable type of item. In these examples, entries 136 include number of external bookmarks 124. As a result, a user may select one of number of external bookmarks 124 to retrieve a resource.

For example, a selection of an external bookmark in number of external bookmarks 124 may retrieve webpage 126 from website 128. Webpage 126 may be displayed by application program 118 in a manner that allows for easier viewing when attempting to use function 122 in functions 123. Additionally, a user may add bookmarks to number of external bookmarks 124 for function 122. A user may desire to add a new bookmark to number of external bookmarks 124 if the user finds another webpage providing useful information for function 122.

For example, application program 118 may receive user input 140. User input 140 is a second user input that adds number of new external bookmarks 142. In these illustrative examples, number of new external bookmarks 142 is associated with a function, such as function 122. Of course, number of new external bookmarks 142 may be associated with other functions in functions 123 other than function 122.

In this particular example, number of new external bookmarks 142 is added to number of external bookmarks 124. In this manner, a user may add more bookmarks to number of external bookmarks 124 as the user finds other useful information relating to function 122.

User input 140 may take a number of different forms. For example, user input 140 may be a request to import number of new external bookmarks 142. Number of new external bookmarks 142 may be located in a file that is imported by application program 118 for addition to number of external bookmarks 124.

In other illustrative examples, user input 140 may be a user entering a universal resource locator for each of number of new external bookmarks 142. Of course, user input 140 may take other forms, depending on the particular implementation. For example, if number of new external bookmarks 142 is the result of a search performed using application program 118, user input 140 may be a selection of number of new external bookmarks 142 from the search results.

The illustration of application program 118 in data processing system 100 in FIG. 1 is not meant to imply physical or architectural limitations to the manner in which other illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, number of external bookmarks 124 may be stored in a database accessed by application program 118. This database also may be accessed by other applications that may include similar features to the ones that number of external bookmarks 124 is associated with in function 122.

In some illustrative examples, webpage 126 may be displayed by another application other than application program 118. For example, webpage 126 may be displayed by browser 138.

Program code 144 is located in a functional form on computer readable media 146 that is selectively removable and may be loaded onto or transferred to data processing system 100 and run by processor unit 104. In these illustrative examples, program code 144 may be program code for applications, such as application program 118 and browser 138.

Program code 144 and computer readable media 146 form computer program product 148. In one example, computer readable media 146 may be computer readable storage media 150. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 150 also may take the form of a persistent storage, such as a hard drive, a thumb drive, or a flash memory that is connected to data processing system 100. In some instances, computer readable storage media 150 may not be removable from data processing system 100.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 146 are examples of computer readable storage devices in a tangible form. In these illustrative examples, the terms "computer readable storage device" and "computer readable storage devices" do not include propagation media.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
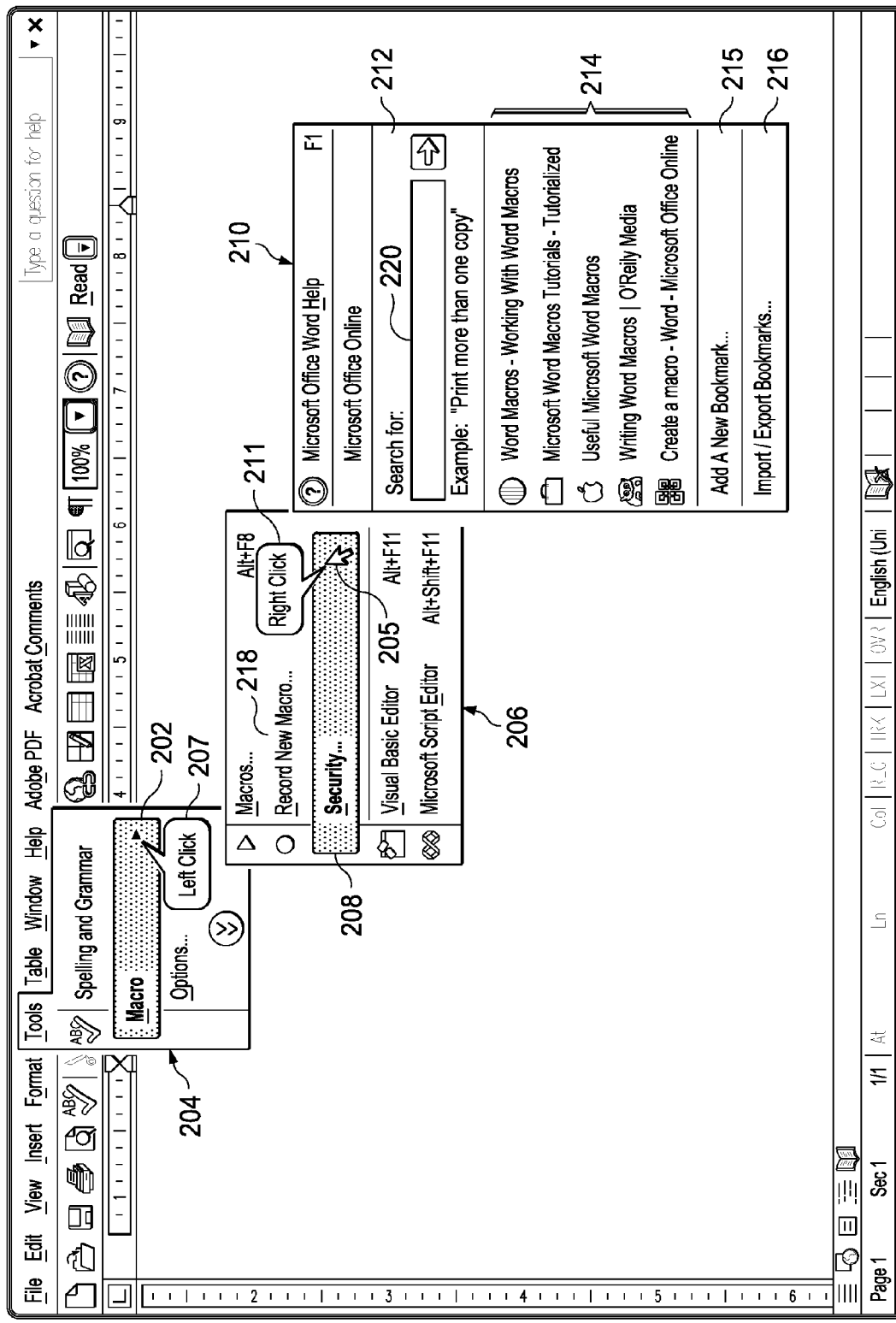
FIG. 2 is an illustration of a graphical user interface in accordance with an illustrative embodiment.

With reference now to FIG. 2, an illustration of a graphical user interface is depicted in accordance with an illustrative embodiment. In this example, graphical user interface 200 is an example of one implementation for graphical user interface 132 in application program 118 in FIG. 1. In graphical user interface 200, a user has selected macro 202 from the different entries in menu 204. Macro 202 is for a macro function in an application.

In this illustrative example, the selection of an entry in a menu displayed in graphical user interface 200 is made by the user initiating a command with, for example, pointer 205 over the location of the entry in the menu. Pointer 205 may be moved over the location of the entry using a mouse, a trackball, a touchpad, or some other pointing device. The selection of macro 202 is made by performing left click 207 at the location over which pointer 205 is moved. In other illustrative examples, the selection of an entry may be made by initiating another command, such as, for example, without limitation, a right click, a function key, or some other mechanism to initiate a selection of the entry over which the pointer is located.

Submenu 206 is displayed in graphical user interface 200 in response to left click 207. Submenu 206 illustrates different functions that may be performed with respect to macro 202. In this example, a user moves pointer 205 over security 208 from the entries in submenu 206. Security 208 relates to security functions for macro 202.

After the selection of security 208, a user may enter a user input, such as right click 211, while pointer 205 is over security 208. This user input is an example of user input 120 in FIG. 1.

With right click 211 while pointer 205 is positioned over security 208, graphical user interface 200 displays menu 210. As illustrated, menu 210 is displayed as a separate window, rather than a submenu, such as submenu 206 in this example. Menu 210 includes search function 212, external bookmarks 214, add new bookmark 215, and import and export function 216 as entries that can be selected by a user.

Search function 212 allows a user to search for websites by entering search terms into field 220 of search function 212. External bookmarks 214 are bookmarks to resources outside of the application. These resources may be, for example, different websites that provide tips or other information desired by a user.

In these illustrative examples, all of external bookmarks 214 are associated with security 208. After the user moves pointer 205 over security 208 and performs right click 211, external bookmarks 214 are identified. In these illustrative examples, external bookmarks 214 are displayed in menu 210.

If a different entry is selected, a different number of external bookmarks are displayed. Those bookmarks are with the ones associated with the particular entry selected. For example, if record new macro 218 is the entry selected in submenu 206 by a user input, this selection results in a menu similar to menu 210 being displayed. The difference in the new menu is the external bookmarks displayed in the new menu. Those external bookmarks displayed in the new menu would be ones associated with record new macro 218.

In these illustrative examples, the association of external bookmarks with a function is made by the user. The user may associate external bookmarks with a function in a number of different ways. For example, the user may use import and export bookmarks function 216. Import and export bookmarks function 216 allows a user to add additional bookmarks to external bookmarks 214. For example, the user may import additional bookmarks to external bookmarks 214 from a database or list of bookmarks. In another example, results from terms entered into search field 220 may be selected by the user for addition to external bookmarks 214.

In yet other examples, a user may use import and export bookmarks function 216 to export bookmarks from external bookmarks 214. For example, the user may export bookmarks to a database of bookmarks. The bookmarks exported may be bookmarks within external bookmarks 214 or bookmarks in the results from terms entered into search field 220.

Figure 3:
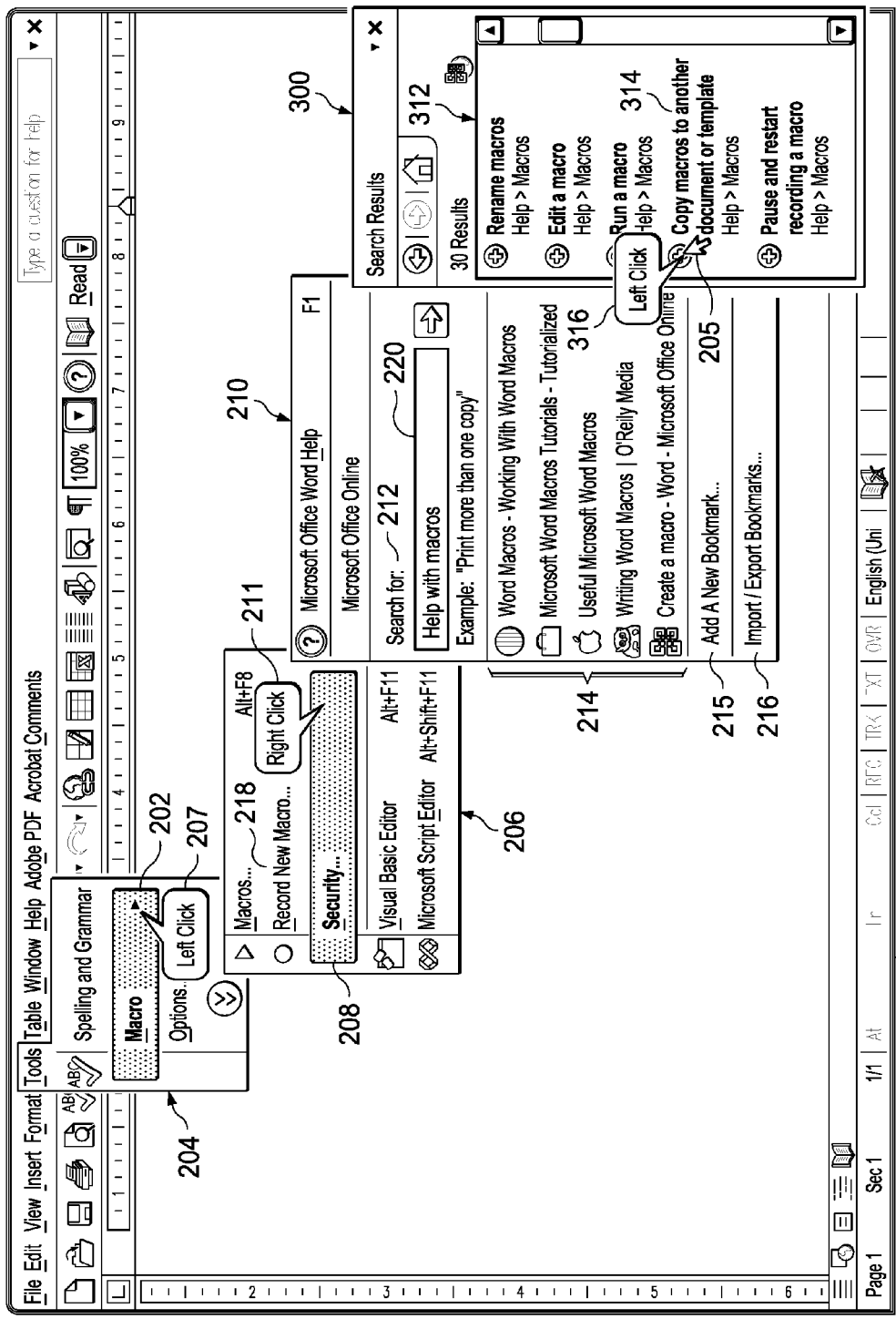
FIG. 3 is an illustration of search results in a graphical user interface in accordance with an illustrative embodiment.

With reference now to FIG. 3, an illustration of search results in a graphical user interface is depicted in accordance with an illustrative embodiment. In this example, graphical user interface 200 displays window 300. Window 300 presents search results 312 obtained from using search function 212. In this illustrative example, search results 312 in window 300 are links to resources, such as web pages. A link from search results 312 may be added to external bookmarks 214 in these illustrative examples. For example, pointer 205 may be placed over link 314. A user may enter a user input, such as left click 316, to add link 314 as an external bookmark to external bookmarks 214.

Figure 4:
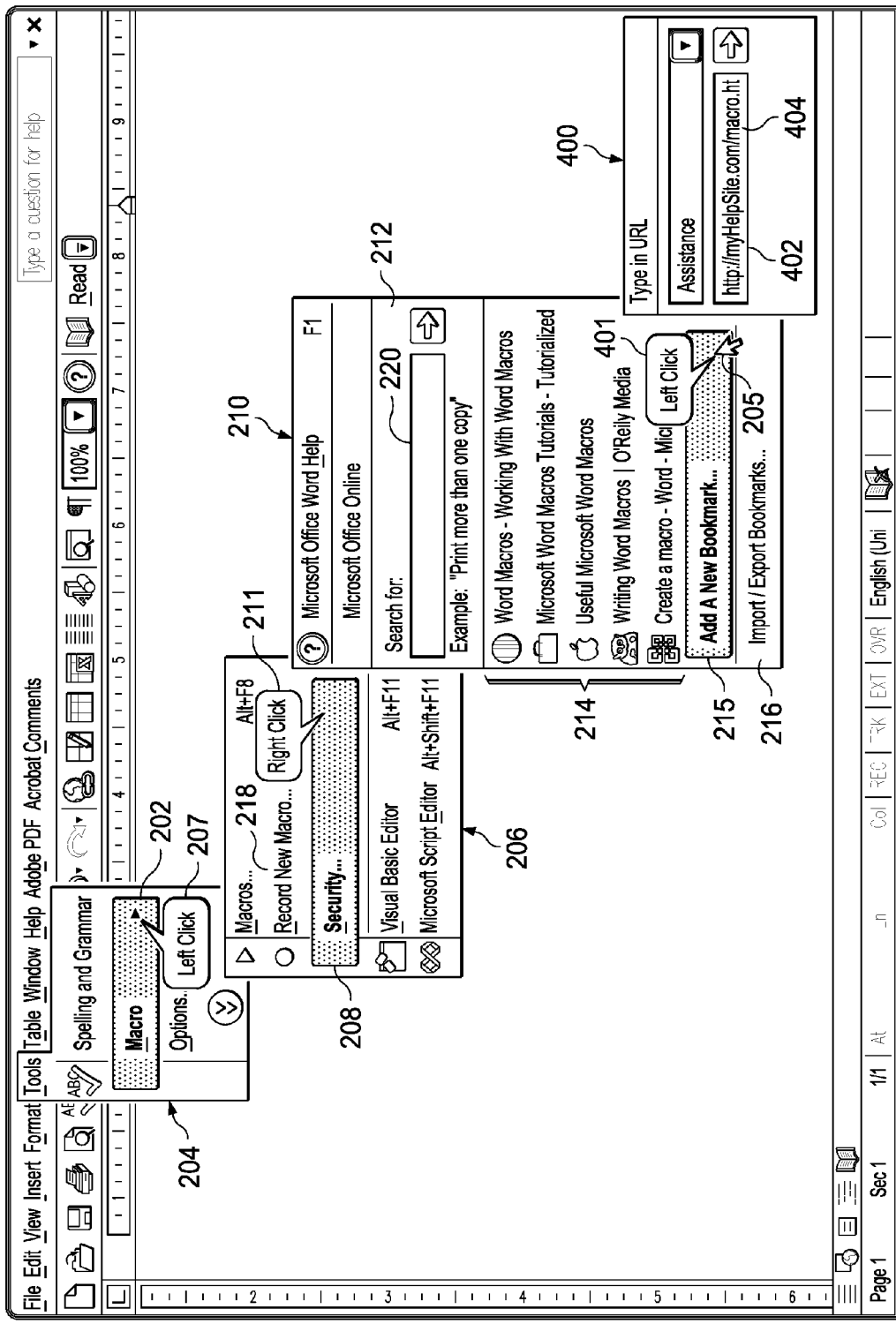
FIG. 4 is an illustration of an addition of bookmarks into a graphical user interface in accordance with an illustrative embodiment.

With reference now to FIG. 4, an illustration of an addition of bookmarks into a graphical user interface is depicted in accordance with an illustrative embodiment. In this example, the user moves pointer 205 over add a new bookmark 215 and performs left click 401. Left click 401 with pointer 205 over add a new bookmark 215 results in window 400 being displayed in graphical user interface 200. Window 400 includes field 402. A URL, such as URL 404 may be entered in field 402. The entry of URL 404 may cause URL 404 to be added as an external bookmark to external bookmarks 214 in these illustrative examples.

Figure 5:
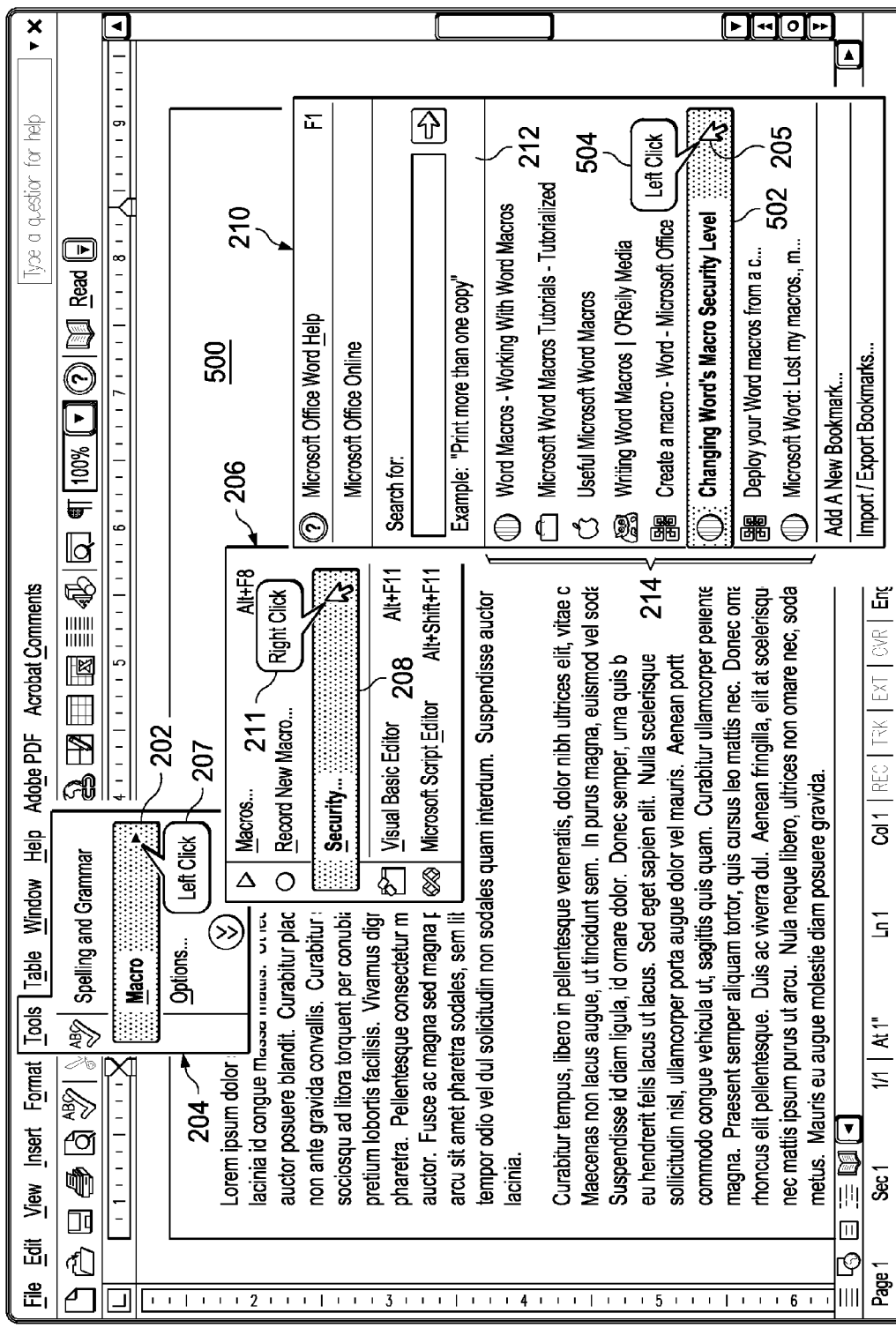
FIG. 5 is an illustration of a selection of a bookmark using a graphical user interface in accordance with an illustrative embodiment.

With reference now to FIG. 5, an illustration of a selection of a bookmark using a graphical user interface is depicted in accordance with an illustrative embodiment. In this illustrative example, graphical user interface 200 is illustrated with window 500. Window 500 displays a word document created using the application. The user moves pointer 205 over external bookmark 502 in menu 210. Left click 504 with pointer 205 over external bookmark 502 results in a selection of external bookmark 502 in menu 210.

Figure 6:
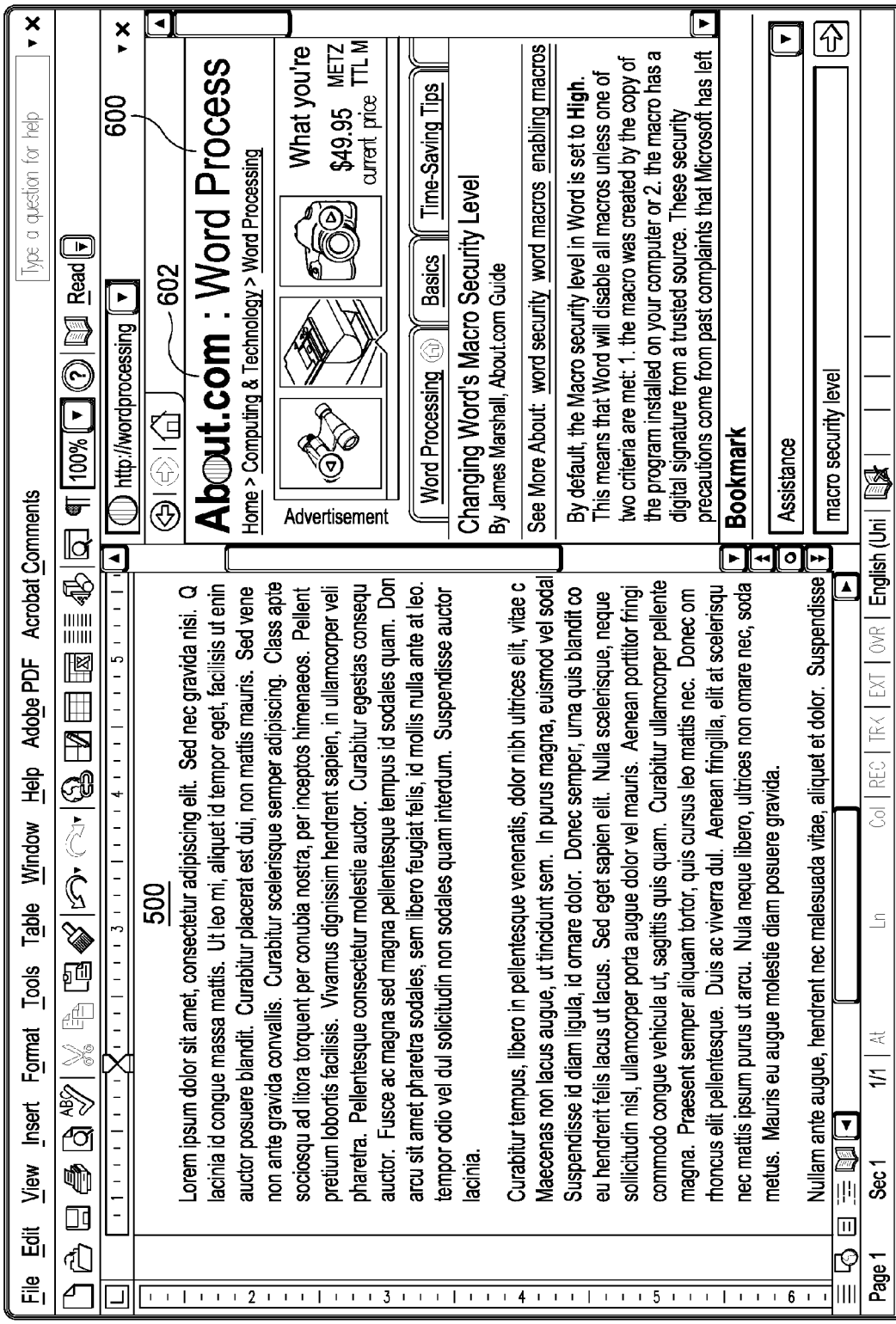
FIG. 6 is an illustration of a graphical user interface displaying a webpage for an external bookmark in accordance with an illustrative embodiment.

With reference now to FIG. 6, an illustration of a graphical user interface displaying a webpage for an external bookmark is depicted in accordance with an illustrative embodiment. In this illustrative example, window 600 is displayed in graphical user interface 200 in response to left click 504 with pointer 205 over external bookmark 502 in menu 210 in FIG. 5. In other words, window 600 is displayed in response to a selection of external bookmark 502 in menu 210. Window 600 includes webpage 602 for external bookmark 502. As depicted, window 600 is displayed in addition to window 500. Window 500 may be reduced in size in graphical user interface 200 as compared to window 500 in FIG. 5 to allow for window 600 to be displayed.

Figure 7:
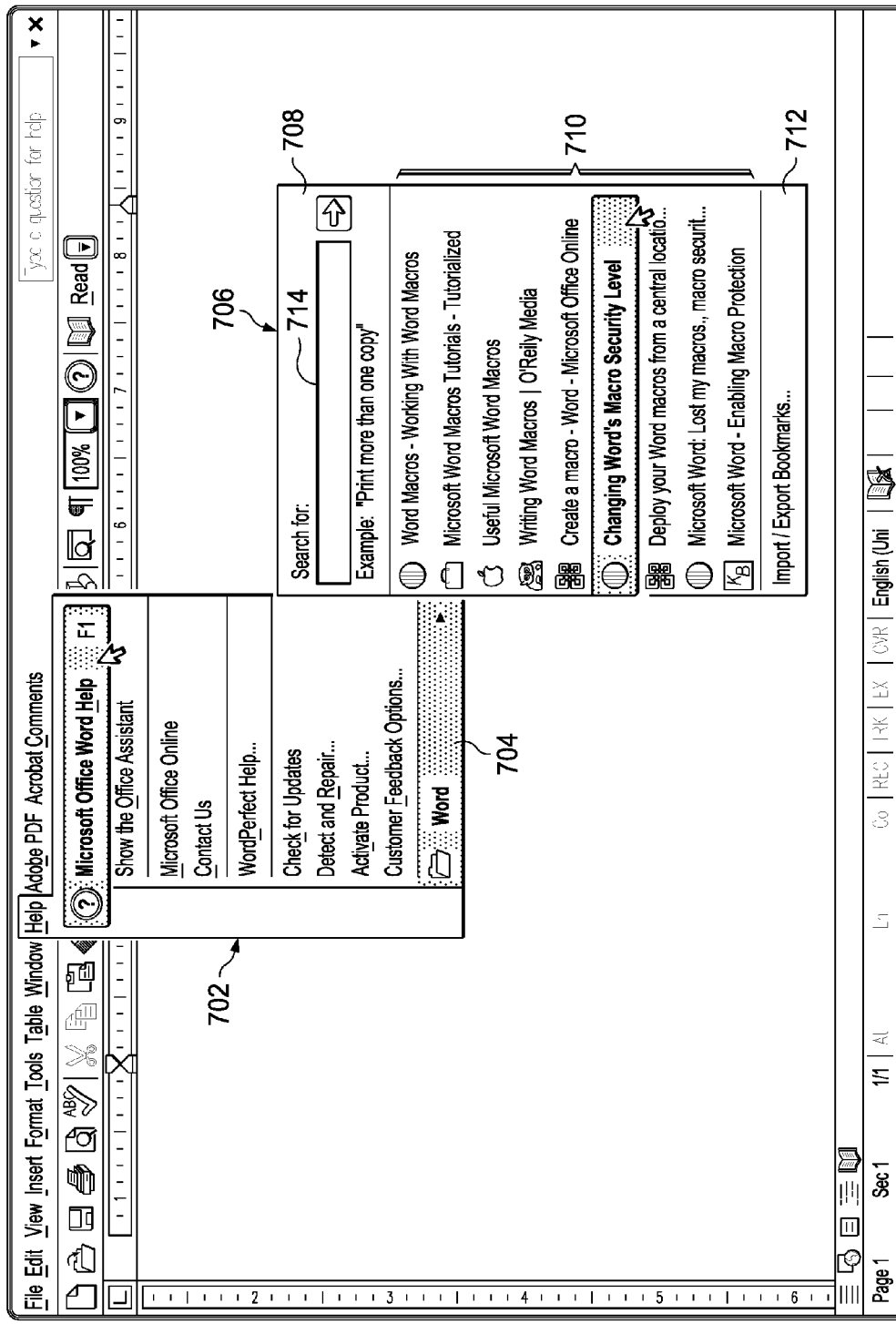
FIG. 7 is an illustration of a graphical user interface with bookmarks in an application in accordance with an illustrative embodiment.

With reference now to FIG. 7, an illustration of a graphical user interface with bookmarks in an application is depicted in accordance with an illustrative embodiment. In this illustrative example, graphical user interface 700 is for an application, such as application program 118 in FIG. 1. Graphical user interface 700 is an example of an implementation for graphical user interface 132 in FIG. 1. As depicted, a user has selected help menu 702. In this example, the user has selected word 704 from the entries in help menu 702.

In response to selecting word 704, submenu 706 is displayed in graphical user interface 700. In this example, submenu 706 includes search 708, external bookmarks 710, and import and export bookmarks 712. Search 708 allows a user to enter terms into field 714. Those terms may be sent to a search engine to identify information at different websites that may be of interest to a user.

External bookmarks 710, in this example, are a collection of all of the bookmarks for all of the different functions that are present for the application. In this example, external bookmarks 710 are not solely for a particular function but all of the bookmarks that have been saved for the application. Import and export bookmarks 712 allow a user to import or export bookmarks to or from the application.

The illustration of graphical user interface 200 in FIGS. 2-6 is an example of one manner in which graphical user interface 132 in FIG. 1 may be implemented. This illustration is not meant to imply limitations to the manner in which graphical user interface 132 may be implemented. For example, in other illustrative examples, other types of presentation mechanisms may be used. For example, without limitation, instead of presenting menu 210 as a separate window, menu 210 may be presented as a submenu that shows up in response to a right click on security 208. In still other illustrative examples, other entries, other than those illustrated, may be used. For example, in menu 210, other options may be present. As one example, an option to search for help items provided by the application also may be present. In some illustrative examples, some entries illustrated in menu 210 may be omitted. For example, import and export bookmarks 216 may be unnecessary and omitted in some implementations.

Figure 8:
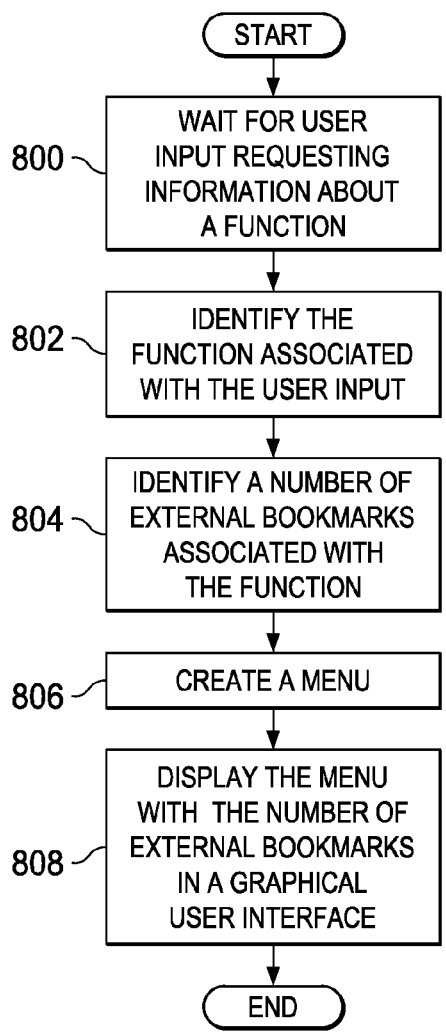
FIG. 8 is an illustration of a flowchart of a process for managing bookmarks in accordance with an illustrative embodiment.

With reference now to FIG. 8, an illustration of a flowchart of a process for managing bookmarks is depicted in accordance with an illustrative embodiment. The process illustrated in FIG. 8 may be implemented in program code for application program 118 in FIG. 1.

In these examples, application program 118 waits for user input 120 requesting information about a function (step 800). Upon receiving the user input, application program 118 identifies the function associated with user input 120 (step 802). In these illustrative examples, the function may be identified in a number of different ways. For example, the function may be one that has been selected in a menu by the user prior to receiving user input 120 in step 800. In step 802, in this illustrative example, the function is identified as function 122 in functions 123.

Application program 118 then identifies number of external bookmarks 124 associated with function 122 (step 804). Number of external bookmarks 124 for function 122 may be identified in a number of different ways. For example, number of external bookmarks 124 may be stored in association with function 122. More specifically, number of external bookmarks 124 may be stored in a data structure, such as a file, having a pointer to function 122, an identification of function 122, or some other suitable mechanism for associating number of external bookmarks 124 with function 122.

Application program 118 then creates menu 134 (step 806). Menu 134 contains number of external bookmarks 124 and any other suitable menu entries. Thereafter, application program 118 displays menu 134 with number of external bookmarks 124 in graphical user interface 132 (step 808), with the process terminating thereafter.

Figure 9:
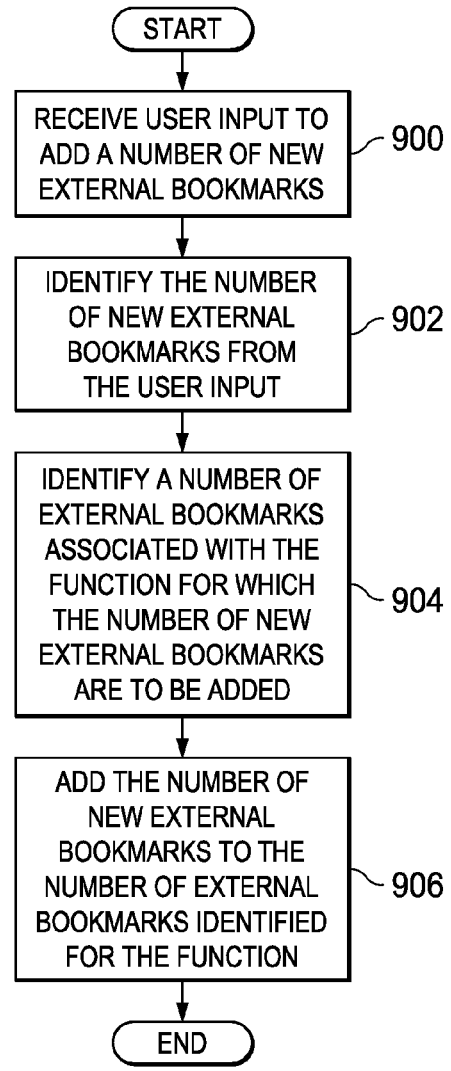
FIG. 9 is an illustration of a flowchart of a process for adding bookmarks in accordance with an illustrative embodiment.

With reference now to FIG. 9, an illustration of a flowchart of a process for adding bookmarks is depicted in accordance with an illustrative embodiment. In this illustrative example, the process may be implemented in program code for application program 118 in FIG. 1.

Application program 118 receives user input 140 to add number of new external bookmarks 142 (step 900). Application program 118 then identifies number of new external bookmarks 142 from user input 140 (step 902). In this illustrative example, the new external bookmarks may be identified in a number of different ways. For example, user input 140 in step 900 may include an identification of a file in which number of new external bookmarks 142 are present. In other illustrative examples, the user may enter each of number of new external bookmarks 142 into a field in graphical user interface 132. Number of new external bookmarks 142 is for function 122 in functions 123 in application program 118 in this example.

Application program 118 then identifies number of external bookmarks 124 associated with function 122 for which number of new external bookmarks 142 are to be added (step 904). Thereafter, application program 118 adds number of new external bookmarks 142 to number of external bookmarks 124 identified for function 122 (step 906), with the process terminating thereafter.

Thus, the different illustrative embodiments provide a method and apparatus for managing bookmarks. In the illustrative examples, in response to receiving the user input requesting information about a function in an application at a processor unit, an application running on the processor unit identifies a number of external bookmarks associated with the function. The application displays the number of identified bookmarks.

In these illustrative examples, the association of bookmarks with a function provides a user a capability to see resources external to the application that are relevant to the function. As a result, when a user wishes to obtain more information on a function, the user may see previously-identified resources. For example, a user may infrequently create pivot tables in a spreadsheet program. The help information in the application may not provide all of the steps or steps in a fashion easily understood by the user. The user may find an external website that provides the steps in a concise or easily understood manner. The user is able to store the website as an external bookmark in association with the function in the application. In this manner, when the user goes to use the function in the application, the user may easily select the external bookmark and see the steps needed to create a pivot table.

In this manner, information regarding functions may be more easily accessible to users. Further, using the different illustrative embodiments, the need to open a separate application, such as a web browser, to view a resource may be avoided. Further, the user having to search for the appropriate bookmark in the web browser also may be avoided. In this manner, the time needed to find information about functions may be reduced.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction system. For the purposes of this description, a computer usable or computer readable medium can be any tangible apparatus that can contain or store for use by or in connection with the instruction system, apparatus, or device.

The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing bookmarks, the method comprising the steps of:

displaying one or more first bookmarks associated with a specific function in an application program;

a computer receiving input from a user to correlate one or more second bookmarks to the specific function in the application program, each of the second bookmarks comprising a user-selectable hyperlink to a web page or file outside of the computer, and in response to the user input, the computer recording that the one or more second bookmarks are correlated to the specific function in the application program; and responsive to a subsequent request from the user to the computer for information about the specific function in the application program and the application program being open in the computer, the computer identifying and displaying the one or more first bookmarks and the one or more second bookmarks.

2. The method of claim 1, wherein the input is a first input from the user and further comprising:

responsive to the computer receiving a second input from the user to add another bookmark to the one or more second bookmarks for another resource associated with the specific function, the other bookmark comprising another link to another web page or file outside of the computer where the other resource associated with the specific function is located, the computer adding the other bookmark to the one or more second bookmarks of resources associated with the specific function and displaying the one or more first bookmarks and the one or more second bookmarks including the other bookmark.

3. The method of claim 1 further comprising:

the computer receiving the one or more second bookmarks using an import function that imports the one or more second bookmarks.

4. The method of claim 1, wherein the user-selectable hyperlink to the web page or file outside of the computer is a universal resource locator.

5. The method of claim 1, wherein the input from the user is a selection of a menu item in the application program.

6. The method of claim 1, wherein the step of displaying the one or more first bookmarks and one or more second bookmarks comprises displaying the one or more first bookmarks and the one or more second bookmarks in the application program as a menu item in a menu associated with the specific function.

7. The method of claim 6 further comprising:

displaying a search function in the menu associated with the specific function.

8. The method of claim 1, further comprising:

responsive to the computer receiving another input from the user selecting a bookmark in the one or more second bookmarks, the computer using the hyperlink in the selected bookmark to retrieve a copy of the web page or file and display the copy of the web page or file in a window of the application program.

9. The method of claim 1, wherein the one or more second bookmarks are retrieved by the computer from a database comprising bookmarks for a plurality of applications having features similar to the application program.

10. The method of claim 1, further comprising:

responsive to another request from the user to display other bookmarks, the computer displaying the other bookmarks; and while the other bookmarks are displayed, the computer receiving a selection from the user to correlate one of the other bookmarks to the specific function of the application program, and in response, the computer recording that the one of the other bookmarks is also correlated to the specific function in the application; and in response to a subsequent request from the user to the computer for information about the specific function in the application program and the application program being open in the computer, the computer identifying and displaying the one or more first bookmarks, the one or more second bookmarks, and the one of the other bookmarks.

11. A data processing system for managing bookmarks, the data processing system comprising:

one or more processors;

one or more computer readable memories;

one or more computer readable storage devices;

first program instructions to display one or more first bookmarks associated with a specific function in an application program;

second program instructions to receive input from a user to correlate one or more second bookmarks to the specific function in the application program, each of the second bookmarks comprising a user-selectable hyperlink to a web page or file outside of the application program, and in response to the user input, record that the one or more second bookmarks are correlated to the specific function in the application program; and third program instructions to identify and display the one or more first bookmarks and the one or more second bookmarks in response to a subsequent request from the user to the data processing system for information about the specific function in the application program and the application program being open in the data processing system, wherein the first program instructions, the second program instructions, and the third program instructions are stored on at least one of the one or more storage devices for execution by at least one of the one or more processors via at least one of the one or more memories.

12. The data processing system of claim 11, wherein the input is a first input from the user and further comprising:

fourth program instructions to add another bookmark to the one or more second bookmarks of resources associated with the specific function and display the one or more first bookmarks and the one or more second bookmarks including the other bookmark in response to receiving a second input from the user to add the other bookmark to the one or more second bookmarks for another resource associated with the specific function, the other bookmark comprising another link to another web page or file outside of the application program where the other resource associated with the specific function is located, wherein the fourth program instructions are stored on at least one of the one or more storage devices for execution by at least one of the one or more processors via at least one of the one or more memories.

13. The data processing system of claim 11, further comprising:

fourth program instructions to receive the one or more second bookmarks using an import function that imports the one or more second bookmarks, wherein the fourth program instructions are stored on at least one of the one or more storage devices for execution by at least one of the one or more processors via at least one of the one or more memories.

14. The data processing system of claim 11, wherein the user-selectable hyperlink to the web page or file outside of the application program is a universal resource locator.

15. The data processing system of claim 11, wherein the input from the user is a selection of a menu item in the application program.

16. The data processing system of claim 11, wherein in the second program instructions to display the one or more first bookmarks and the one or more second bookmarks comprises:
   program instructions to display the one or more first bookmarks and the one or more second bookmarks in the application program as a menu item in a menu associated with the specific function.

17. The data processing system of claim 16, further comprising:
   fourth program instructions to display a search function in the menu associated with the specific function, wherein the fourth program instructions are stored on at least one of the one or more storage devices for execution by at least one of the one or more processors via at least one of the one or more memories.

18. A computer program product for managing bookmarks, the computer program product comprising:
   a computer readable storage device;
   program code, stored on the computer readable storage device, for displaying one or more first bookmarks associated with a specific function in an application program;
   program code, stored on the computer readable storage device, for receiving input from a user to correlate one or more second bookmarks to the specific function in the application program, each of the second bookmarks comprising a user-selectable hyperlink to a web page or file outside of the application program, and in response to the user input, recording that the one or more second bookmarks are correlated to the specific function in the application program; and
   program code, stored on the computer readable storage device, for identifying and display the one or more first bookmarks and the one or more second bookmarks in response to a subsequent request from the user for information about the specific function in the application program and the application program being open in a computer.

19. The computer program product of claim 18, wherein the input is a first input from the user and further comprising:
   program code, stored on the computer readable storage device, for adding another bookmark to the one or more second bookmarks of resources associated with the specific function and display the one or more first bookmarks and the one or more second bookmarks including the other bookmark in response to receiving a second input from the user to add the other bookmark to the one or more second bookmarks for another resource associated with the specific function, the other bookmark comprising another link to another web page or file outside of the application program where the other resource associated with the specific function is located.

20. The computer program product of claim 18 further comprising:
   program code, stored on the computer readable storage device, for receiving the one or more second bookmarks using an import function that imports the one or more second bookmarks.

21. The computer program product of claim 18, wherein the user-selectable hyperlink to the web page or file outside of the application program is a universal resource locator.

22. The computer program product of claim 18, wherein the input from the user is a selection of a menu item in the application program.

23. The computer program product of claim 18, wherein the program code, stored on the computer readable storage device, for displaying the one or more first bookmarks and the one or more second bookmarks comprises:
   program code, stored on the computer readable storage device, for displaying the one or more first bookmarks and the one or more second bookmarks in the application program as a menu item in a menu associated with the specific function.

* * * * *